Jan. 14, 1964 L. E. SMITH 3,117,638
GRAVITY OPERATED WEIGHING MACHINE
Filed June 13, 1960 3 Sheets-Sheet 1

INVENTOR.
LAWRENCE E. SMITH
BY Morton L. Adler
ATTORNEY.

Jan. 14, 1964    L. E. SMITH    3,117,638
GRAVITY OPERATED WEIGHING MACHINE
Filed June 13, 1960    3 Sheets-Sheet 2

INVENTOR.
LAWRENCE E. SMITH
BY Morton S. Adler
ATTORNEY.

Jan. 14, 1964 L. E. SMITH 3,117,638
GRAVITY OPERATED WEIGHING MACHINE
Filed June 13, 1960 3 Sheets-Sheet 3
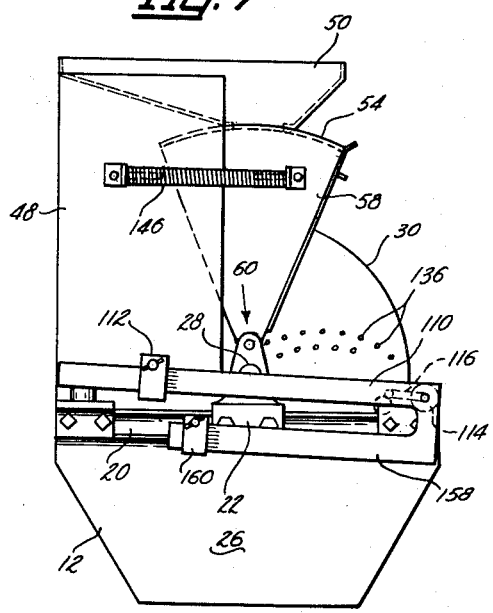
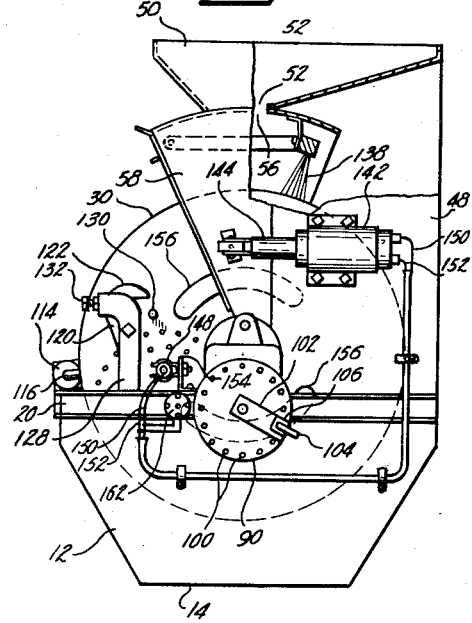
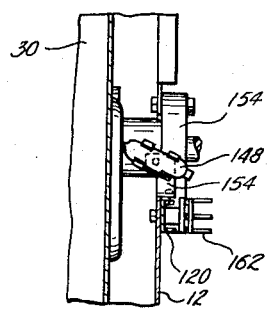
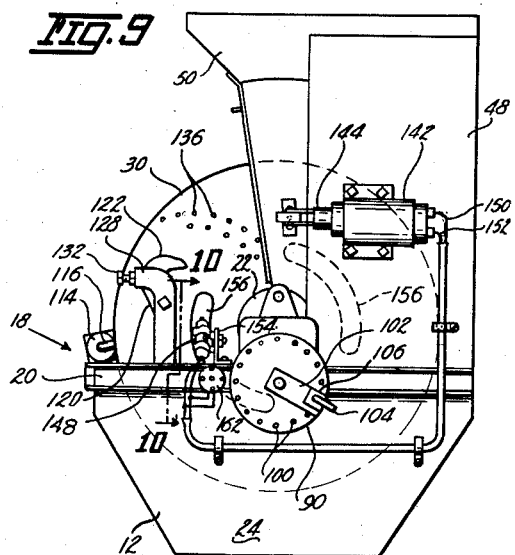
INVENTOR.
LAWRENCE E. SMITH
BY Morton S. Adler
ATTORNEY.

United States Patent Office 3,117,638
Patented Jan. 14, 1964

3,117,638
GRAVITY OPERATED WEIGHING MACHINE
Lawrence E. Smith, Whittier, Iowa
Filed June 13, 1960, Ser. No. 35,703
9 Claims. (Cl. 177—14)

This invention relates to improvements in grain weighing machines and more particularly to such machines that operate automatically by the force of gravity.

One of the important objects contemplated herein is the provision of a multi-pocket rotating bucket or drum associated with a grain receiving hopper and including closure means for selectively opening and closing communication between the hopper and the bucket. In this respect a further object resides in provisions for respective manual and automatic means for actuating the closure.

Another important object inhering in this invention is the provision of a metering wheel therewith which can be set to permit a predetermined number of bucket rotations and which automatically effects the closing of communication between the hopper and the bucket to terminate the operation of the machine when such number of rotations have been completed.

A further object includes an improved stop means to regulate the rotation of the bucket so that the pockets properly register with the hopper and with the stop operating so as to eliminate for all practical purposes the accumulation and packing of grain on the walls of the drum pockets.

Still another object is to provide an improved scale for selectively regulating the amount of grain that can be weighed in each pocket during any given weighing operation.

Further objects and the more obvious advantages of the invention will be mentioned or else appear plainly from the description which follows.

Figures 1, 5:
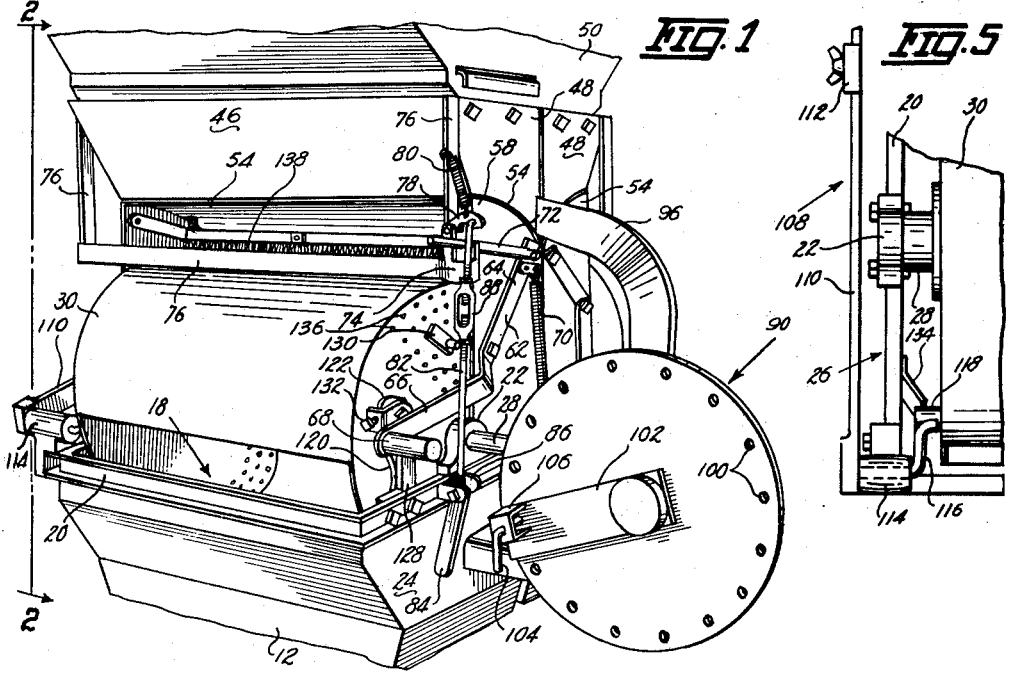
Figure 2:
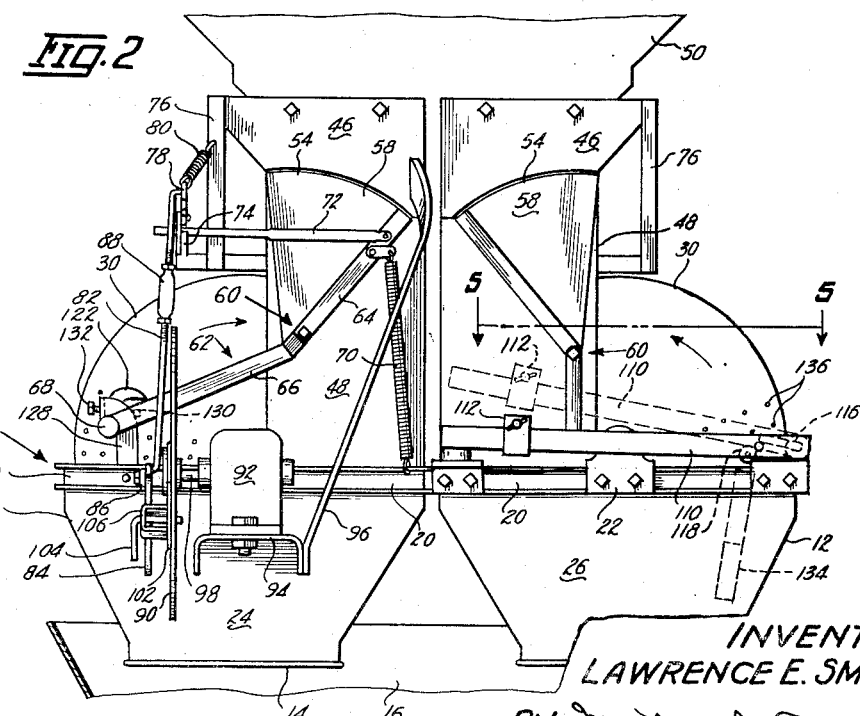
Figure 3:
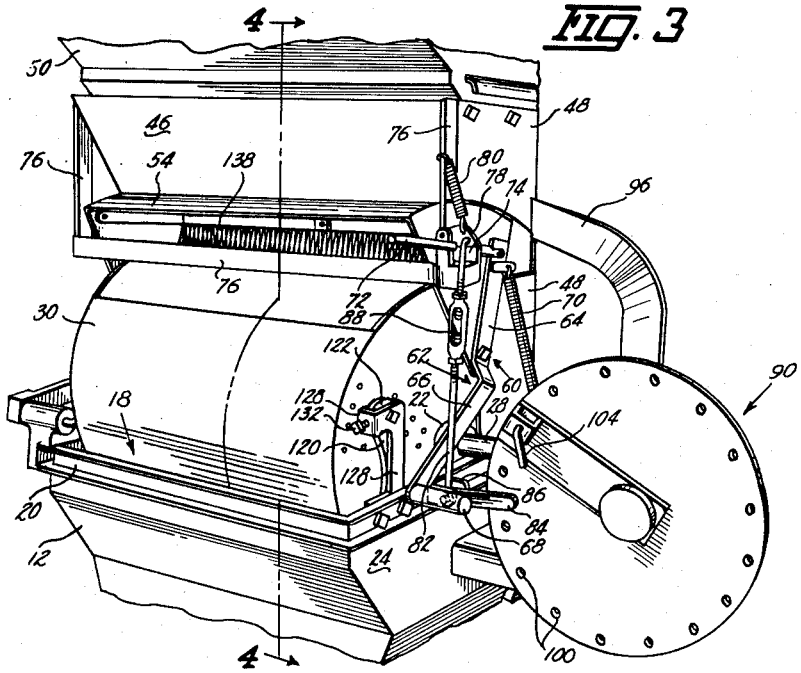
Figure 4:
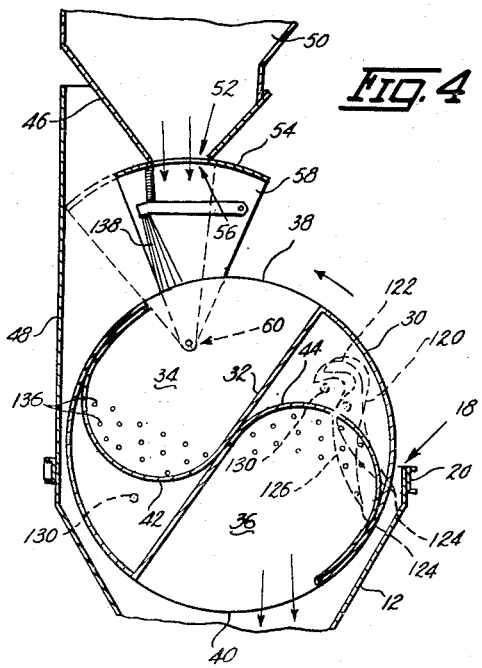
Figure 6:
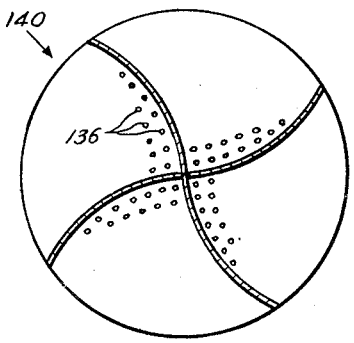

This invention consists of novel parts and combination of parts to be hereinafter described whereby the objects set forth are attained, as pointed out in the claims, and illustrated in the accompanying drawings, in which:

FIG. 1 is a perspective view of my new weighing machine which is preferably shown arranged in a battery of two machines, FIG. 2 is an enlarged side view taken from the line 2—2 of FIG. 1, FIG. 3 is a perspective view similar to FIG. 1 but showing certain of the control apparatus in a different position of operation, FIG. 4 is a cross sectional view taken on the line 4—4 of FIG. 3, FIG. 5 is a top plan view of the weight scale taken from the line 5—5 of FIG. 2, FIG. 6 is a cross sectional view showing a modified structure for the interior of the drum or bucket, FIG. 7 is a side view of this invention showing a modified structure for controlling the closure and including a scale capable of more detailed setting, FIG. 8 is a side view of the opposite side of the weigher shown in FIG. 7, FIG. 9 is similar to FIG. 8 but showing certain of the control apparatus in a different operating position, and FIG. 10 is an enlarged plan view of an electrical switch arrangement taken from the line 10—10 of FIG. 9.

Referring to the drawings a hopper 12 has the open bottom 14 disposed over a conveyor, chute or receptacle 16 in which grain is deposited as will later appear. The top 18 of hopper 12 is reinforced by a rigid frame means 20 which carries bearing members 22 on respective opposite ends 24 and 26 for rotatably supporting an axle 28 on which there is mounted a drum or drum-like bucket 30 for rotation therewith. Such bucket 30 (FIG. 4) has a longitudinal partition 32 defining two equal compartments or pockets 34 and 36 provided with the respective oppositely disposed openings 38 and 40 at the perimeter and the arcuate bottoms 42 and 44. At the normal position of rest, openings 38 and 40 are in a vertical plane and partition 32 is angularly disposed to such plane. In devices of this type, a drum member having pockets and rotatably mounted on a hopper is old, and in operation the buckets of such devices successively receive grain to be weighed with the drum quickly turning by gravity as the receiving bucket is filled to a desired capacity so that the grain is discharged through the bottom of the hopper. Such weighers have also included scale means for regulating the amount of grain necessary to rotate the drum, and in this invention I have provided certain improvements relating to the drum, the control of grain flow into the buckets, a metering device for terminating the operation of the weigher automatically and certain improvements in the scale associated therewith.

In spaced relationship above the hopper 12, a chute 46 is supported by braces 48 mounted to or integral with one side of the top end 18 of the hopper for the purpose of receiving grain from a spout or the like 50, connected to a source of grain supply, and directing it into one of the pockets 34 and 36. The bottom of the chute 46 defines a restricted opening 52 and means for both manually and automatically controlling the flow of grain through opening 52 are included in this invention. For a description as to the manual means, reference is made now to FIGS. 1-4. The opening and closing of communication between chute 46 and the pockets 34 and 36 through chute opening 52 is effected by an arcuate door, plate or slide member 54 which has a length co-extensive with the length of the drum and opening 52, and is provided with a longitudinal opening 56 (FIG. 4) adapted to register with opening 52 at times as will later appear. Each end of door 54 carries a triangular bracket 58 pivotally secured at its apex end 60 to the respective braces 48 at opposite sides of the drum 30 whereby it is closely adjacent the bottom of opening 52 and can be moved to effectively open or close the same depending upon the relative position of opening 56 as is obvious. The closed position of the door or slide 54 is shown in FIG. 2 and for moving it to open position (FIG. 4), a modified bell crank 62 having the upper and lower arm members 64 and 66 respectively has the upper arm 64 secured to one of the doors 54 and the lower arm 66 extending laterally and exteriorly of the drum 30 and terminating in an angularly disposed handle 68. Crank 62 extends over and is secured to the pivot point 60 of bracket 58 so that a downward movement of handle 68 (FIG. 3) moves door 54 to open position.

The automatic return of closure member or door 54 to closed position after a predetermined amount of grain has passed through this device is one of the important features of this invention and is accomplished as follows, reference being made to FIGS. 1-3. A tension spring 70 connects from hopper frame 20 to the upper portion of crank arm 64 and is arranged so as to normally urge crank 62 in a direction that will place door 54 in closed position. However, a rod 72 secured at one end to the upper portion of crank arm 64 has its other end positioned to move over a locking jaw 74 suitably secured to a support 76 carried by chute 46. A second locking jaw 78 complementary to and pivotally secured at one end to jaw 74 is normally yieldingly held away from jaw 74 by a spring 80 connected to a portion of support 76. The other end of jaw 78 is engaged by an operating rod 82 which extends downwardly to a toggle action connection with lever 84 carried in a bracket 86 on hopper frame 20. Rod 82 may include a turnbuckle 88 for obvious reasons. Thus, with crank 62 moved downwardly so as to place door 54 in open position relative to chute 46, rod 72 will extend between jaws 74 and 76 and by moving lever 84 upwardly (FIG. 3) such jaws will be tightly clamped against rod 72 sufficiently to hold door 54 against movement by spring 70. When lever 84 is moved downwardly (FIG. 1), spring 70 will, of course, move member 54 to closed position and the automatic downward movement of lever 84 is accomplished by my new metering wheel 90 which I shall now describe.

At the same side of the drum 30 as the crank 62 and associated parts described above, the axle 28 projects for connection with a suitable gear box 92 which is mounted on a platform 94 supported by a brace 96 carried by member 46. Wheel 90, which is of disc shape, is rotatably secured to a shaft 98 also connected to the gear box 92 and it will thus be appreciated that the number of rotations of wheel 90 relative to the number of rotations of drum 30 on axle 28 will be determined by the gear ratios in box 92 and this may, of course, be of arbitrary determination. Wheel 92 is provided with spaced holes 100 about its periphery and includes a gauge arm 102 having one end pivotally secured thereto at its axis and the other end having pawl means 104 for selective removable engagement with holes 100. Pawl 104 is mounted through a projecting support 106 on arm 102. The position of wheel 90 is such that when lever 84 is in its upward position (FIG. 3), it is closely adjacent the peripheral portion of wheel 90. By this arrangement, with arm 102 secured in a given position relative to one of the holes 100, it will be understood that wheel 90 turns as the drum 30 rotates, and eventually the support 106 will contact lever 84 and move it downwardly. Lever 84 being of a toggle type will snap downwardly as soon as it is moved past center whereby spring 70 can act to close door 54. In adjusting arm 102 it will be understood that a predetermined number of rotations of the drum 30 is represented by the distances between holes 100 and with this information together with knowledge of the amount of grain being weighed in each pocket 34 and 36, the matter of setting pawl 104 in the desired hole 100 is a simple calculation. Scale means 108 (FIG. 5) are employed in a well known manner for regulating the desired weight necessary to rotate the buckets 34 and 36 and include a scale beam 110 provided with an adjustable poise 112. One end of beam 110 is pivotally mounted to a bearing member 114 on frame 20 at the top of hopper 12 and has a short arm 116 extending toward the drum 30 and in the path of rotatable studs 118 projecting from the drum sides, there being one such stud for each pocket. Thus as a bucket 34 or 36 is loaded, stud 118 will engage the underside of the scale arm 116 (FIG. 5) and when the load is sufficient to lift the poise 112, the beam 110 is tipped and drum 30 turns quickly by gravity to discharge its load.

The momentum of drum 30 as it quickly turns with a loaded pocket can possibly be sufficient to trip the scale beam again as the succeeding stud 118 comes into place under arm 116 to position the next pocket for receiving grain and to avoid this possibility, I have provided a novel stop means 120 (FIGS. 3 and 4) which is an elongated hook member shaped generally in the form of a question mark so as to include a hook-like head 122 and a tail 124 which is provided with the arcuate edge 126. Stop 120 is pivotally attached below head 122 to a bracket 128 on hopper frame 20 at the opposite side to the scale beam 110 and is normally vertically disposed as shown in FIG. 4 so as to intersect the path of lugs 130 on the corresponding side of drum 30, there being one such lug for each pocket. The position of stop 120 relative to a vertical plane can be adjusted by an engaging set screw 132 on bracket 128. By this arrangement, as the drum 30 quickly rotates, the successive lug 130 first engages the lower portion of edge 126 on the tail portion 124 of stop 120 and as it moves upwardly against such edge, the stop 120 pivots sufficiently so that the hook head portion 122 directly intersects the path of the lug 130 and is abruptly engaged thereby to provide a momentarily but jolting stop action to the drum. The stop 120 will thereafter seek its normal position due to gravity and the curvature of the hook head 122 is such that a subsequent mild contact by lug 130 against the head 122 as the scale beam is tipped will merely cause the head to move out of the way and afford no obstruction. As lug 130 abruptly contacts hook head 122, the reaction on the drum is a momentarily partial reversal of direction of rotation and this can possibly cause the drum to come to rest at a point where the drum pocket is not accurately registered with the chute opening 52. This is avoided by the use of a leaf spring member 134 (FIGS. 2 and 5) connected to the inside of hopper side 26 and extending upwardly and laterally so that the top edge intersects the path of the studs 118. Thus as the drum rotates, a stud 118 will engage spring 134 which will yield to permit it to pass and as lug 130 on the other side of the drum is stopped by member 120 as described and the direction of rotation of the drum is reversed, stud 118 is prevented from any appreciable reverse rotation by the top of spring 134 which has returned to a position in the path of its movement.

For further improving the operation of this weigher, I have placed a plurality of spaced air outlet openings 136 on each end of the drum and in addition a brush 138 carried by brackets 58 is in longitudinal engagement with perimeter of the drum to effect a sweeping action thereon. Each time the drum rotates, a certain amount of grain will fall on the closed surface of the drum between the pocket openings and with brush 138, such grain is swept into the succeeding pocket at the next rotation of the drum. Without such a brush, a good deal of grain is spilled exteriorly of the drum. In actual operation, the pockets fill quickly and rotation of the drum is relatively rapid, so that the brush is very effective for the purpose indicated.

While gravity weighers, as such, are not new, it will be appreciated that the use of my metering wheel 90 permits the weighing operation to continue unattended until the desired amount of grain has been weighed and to stop automatically when this limit has been reached. Heretofore, such weighers have required the attention of an operator to stop the weighing operation at the required time. It should also be pointed out that in FIG. 6 a modified form of drum structure 140 is shown to illustrate an arrangement for more than two pockets.

With reference now to FIGS. 7–10, I have illustrated a modified structure for automatically opening and closing the door 54 each time the drum 30 rotates to empty one of the pockets 34 or 36 together with an improvement in the scale assembly for more accurate readings. With the exception of such new parts as will be described, like parts will be given like numerals relative to the disclosures in FIGS. 1–5.

In FIGS. 7–10 the hand operated means for opening door 54 and the spring means for closing the same are eliminated and in place thereof, I use a solenoid 142 on member 48 and having an operating arm 144 connected to member 58. When the solenoid is not actuated, arm 144 is extended and door 54 is closed, being held in such position by a spring 146 on the opposite member 58 connected between the respective opposite members 48 and 58, the same as the solenoid 142. When actuated, arm 144 retracts to overcome the force of spring 146 and open door 54. Means for actuating and deactuating the solenoid 142 is accomplished by tripping a mercury switch 148 mounted on hopper frame 20 near the metering wheel 90, such switch being connected by leads 150 and 152 to the solenoid. Switch 148 is pivotally mounted on a support 154 so as to be in the path of diametrically spaced arcuate cam strips 156 on the adjacent side of drum 30 so that as the drum 30 rotates, switch 148 will ride over and be tilted by each cam 154 throughout its length, during which time solenoid 142 is actuated and door 54 is open. Cams 156 are so positioned that when either of the pockets 34 and 36 are in registering position with chute opening 52 for receiving grain, such cams are in contact with switch 148 so that door 54 is held open against the force of spring 146. As a pocket is loaded and turns, the cam 156 moves out of contact with switch whereby the solenoid is deactuated and door 54 is closed by spring 146 and thus operation is successively repeated whereby door 54 is closed when no pocket is in position to receive grain.

The scale beam 110 has been supplemented with an additional beam 158 (FIG. 7) and a second poise 160 for more accurate readings and wheel 90 is constructed as previously described and operates in the same manner. A switch 162 across leads 150 and 152 is placed so as to be trippable by member 106 on gauge arm 102 of wheel 90 in the same manner as lever 84 is acted upon in FIG. 3. Thus, when the required grain has been weighed, switch 162 is opened by operation of the metering wheel to deactuate solenoid 142 and door 54 is closed by spring 146. In this respect it is pointed out that member 106 on wheel 90 may be arranged, if desired, to operate against switch 148 to open the circuit of leads 150 and 152 and thus eliminate switch 162.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In a grain weighing machine of the class having a hopper, a drum provided with a plurality of pockets, said drum rotatably mounted in said hopper and turning by the weight of the load of grain in the pockets whereby the grain is discharged into the hopper, and scale beam means operatively associated with the drum to selectively determine the weight necessary to turn the drum, the combination therewith of improvements comprising a chute supported by and spaced above said hopper, said chute provided with a discharge opening positioned to direct grain into said pockets, a closure member for said discharge opening, control means exteriorly of said hopper and connected to said closure member for moving the same to respective open and closed positions relative to said discharge opening, holding means releasably engageable with said control means to hold said control means in a position where said closure member is in open position, a metering wheel connected to and operated by rotation of said drum so as to act upon and release said holding means after a predetermined number of drum rotations, and means automatically acting upon said control means when said holding means is released to effect movement of said closure member to closed position.

2. In a grain weighing machine of the class having a hopper, a drum provided with a plurality of pockets, said drum rotatably mounted in said hopper and turning by the weight of the load of grain in the pockets whereby the grain is discharged into the hopper, and scale beam means operatively associated with the drum to selectively determine the weight necessary to turn the drum, the combination therewith of improvements comprising a chute spaced above said hopper and carried by a bracket mounted thereto, said chute provided with a discharge opening positioned to direct grain into said pockets, a closure member for said discharge opening, a bell crank pivotally mounted to said bracket, one end of said crank connected to said closure member and the other end carrying a handle, a rod connected to and movable with said crank, clamp means for releasably engaging said rod, said crank movable to open said closure member relative to said discharge opening and said clamp means engageable with said rod to hold said crank in such position, spring means on said crank normally urging it in a position where said closure member is in closed position relative to said discharge opening, a lever connected to said clamp means for selectively placing it in and out of clamping engagement with said rod, and a metering wheel connected to and operated by rotation of said drum so as to act upon said lever after a predetermined number of drum rotations whereby said clamp means is released from said rod and said spring means acts to move said closure member to closed position relative to said discharge opening.

3. In a grain weighing machine of the class having a hopper, a drum provided with a plurality of pockets, said drum rotatably mounted in said hopper and turning by the weight of the load of grain in the pockets whereby the grain is discharged into the hopper, and scale beam means operatively associated with the drum to selectively determine the weight necessary to turn the drum, the combination therewith of improvements comprising a chute spaced above said hopper and carried by a bracket mounted thereto, said chute provided with a discharge opening positioned to direct grain into said pockets, a closure member for said discharge opening, a solenoid on said bracket and having an operating arm connected to said closure member, said solenoid when actuated effecting movement of said closure member to open position, spring means on said closure member normally urging it to closed position, a switch on said hopper exteriorly of said drum, a pair of leads connecting said switch to said solenoid, diametrically spaced cam strips on the side of said drum alternately engageable with said switch during the drum rotation, said cams acting on said switch to close the circuit to said solenoid which acts to move said closure member to open position, said cams positioned so that said switch is closed when said pockets register with said discharge opening and is opened as a loaded pocket moves away from said discharge opening at which time said spring means moves said closure member to closed position, a second switch across said leads, a metering wheel connected to and operated by rotation of said drum so as to act upon said second switch after a predetermined number of drum rotations, and said second switch when acted upon by the metering wheel opening the circuit of said leads to deactuate said solenoid and permit the closure member to be moved to closed position by said spring means.

4. In a grain weighing machine of the class having a hopper, a drum provided with a plurality of pockets, said drum rotatably mounted in said ohpper and turning by the weight of the load of grain in the pockets whereby the grain is discharged into the hopper, and scale beam means operatively associated with the drum to selectively determine the weight necessary to turn the drum, the combination therewith of improvements comprising a chute spaced above said hopper and carried by a bracket mounted thereto, said chute provided with a discharge opening positioned to direct grain into said pockets, a closure member for said discharge opening, a solenoid on said bracket connected to said closure member, said solenoid when actuated effecting movement of said closure member to open position, spring means on said closure member normally urging it to closed position, a switch on said hopper exteriorly of said drum, a pair of leads connecting said switch to said solenoid, a pair of spaced switch engaging members on said drum alternately engageable with said switch during the drum rotation, said switch engaging members acting on said switch to close the circuit to said solenoid which acts to move said closure member to open position, said switch engaging members positioned so that said switch is closed when said pockets register with said discharge opening and is opened as a loaded pocket moves away from said discharge opening at which time said spring means moves said closure member to closed position, a metering wheel connected to and operated by rotation of said drum so as to act upon said switch after a predetermined number of drum rotations, and said switch when acted upon by the metering wheel opening the circuit of said leads to deactuate said solenoid and permit the closure member to be moved to closed position by said spring means.

5. In a grain weighing machine of the class having a hopper, a drum provided with a plurality of pockets, said drum rotatably mounted in said hopper and turning by the weight of the load of grain in the pockets whereby the grain is discharged into the hopper, and scale beam means operatively associated with the drum to selectively determine the weight necessary to turn the drum, the combination therewith of improvements comprising a chute supported by and spaced above said hopper, said chute provided with a discharge opening positioned to direct grain into said pockets, a closure member for said discharge opening, control means exteriorly of said hopper and connected to said closure member for moving the same to respective open and closed positions relative to said discharge opening, spaced lugs on one side of said drum, an elongated stop member vertically disposed and pivotally mounted intermediate its ends to a support carried by said hopper, the upper end of said stop member defining a hook shaped head and the lower portion defining an arcuate tail, said stop member disposed in the path of movement of said lugs, rotation of said drum causing said lugs to successively first engage said arcuate tail whereby said head is pivoted directly into the path of said lug and said head is abruptly joltingly engaged thereby, means to prevent any counter rotation of said drum after contact by said lug with said head, said head returning by gravity to its vertical position after contact by said lug, the curvature of said head causing said stop to be pivoted by said lug by a subsequent mild contact therewith so as to permit the continued rotation of said drum, and said lugs and stop member positioned to effect a temporary cessation of drum rotation corresponding to the discharge of grain from said pockets and registering of a successive pocket with said discharge opening.

6. In a grain weighing machine of the class having a hopper, a drum provided with a plurality of pockets, said drum rotatably mounted on an axle in said hopper and turning by the weight of the load of grain in the pockets whereby the grain is discharged into the hopper, and scale beam means operatively associated with the drum to selectively determine the weight necessary to turn the drum, the combination therewith of improvements comprising a closure means on said hopper, a gear box on said hopper connected to one end of said axle, a metering wheel connected to said gear box whereby the amount of rotation of said metering wheel relative to the number of rotations of said drum can be predetermined, selectively adjustable means on said metering wheel to indicate when a desired number of drum rotations has been completed, and means on said metering wheel for acting against said closure means to actuate the same.

7. In a grain weighing machine of the class having a hopper, a drum provided with a plurality of pockets, said drum rotatably mounted on an axle in said hopper and turning by the weight of the load of grain in the pockets whereby the grain is discharged into the hopper, and scale beam means operatively associated with the drum to selectively determine the weight necessary to turn the drum, the combination therewith of improvements comprising a chute supported by and spaced above said hopper, said chute provided with a discharge opening positioned to direct grain into said pockets, a closure member for said discharge opening, control means exteriorly of said hopper and connected to said closure member for moving the same to respective open and closed positions relative to said discharge opening, holding means releasably engageable with said control means to hold said control means in a position where said closure member is open relative to said discharge opening, spring means automatically acting upon said control means when said holding means is released to effect movement of said closure member to closed position, a gear box on said hopper connected to one end of said axle, a metering wheel connected to said gear box whereby the amount of rotation of said metering wheel relative to the number of rotations of said drum can be predetermined, said metering wheel being of disc shape and provided with a plurality of equally spaced openings near and concentric with the perimeter thereof, a gauge arm having one end pivotally attached to said metering wheel at the axis thereof, the other end of said arm carrying a movable pawl selectively insertable in said openings, and said gauge arm capable of acting against said holding means to release the same during rotation of said metering wheel.

8. In a grain weighing machine of the class having a hopper, a drum provided with a plurality of pockets, said drum rotatably mounted in said hopper and turning by the weight of the load of grain in the pockets whereby the grain is discharged into the hopper, and scale beam means operatively associated with the drum to selectively determine the weight necessary to turn the drum, the combination therewith of improvements comprising a chute supported by and spaced above said hopper, said chute provided with a discharge opening positioned to direct grain into said pockets, a closure member for said discharge opening, control means exteriorly of said hopper and connected to said closure member for moving the same to respective open and closed positions relative to said discharge opening, spaced lugs on one side of said drum, an elongated stop member vertically disposed and pivotally mounted intermediate its ends to a support carried by said hopper, the upper end of said stop member defining a hook shaped head, said stop member disposed in the path of movement of said lugs, rotation of said drum causing said lugs to successively first engage said stop member below its pivot point, whereby said head is pivoted directly into the path of said lug and said head is abruptly joltingly engaged thereby, means to prevent any counter rotation of said drum after contact by said lug with said head, said stop member returning by gravity to its vertical position after contact by said lug, the curvature of said head causing said stop to be pivoted by said lug by a subsequent mild contact therewith so as to permit the continued rotation of said drum, and said lugs and stop member positioned to effect a temporary cessation of drum rotation corresponding to the discharge of grain from said pockets and registering of a successive pocket with said discharge opening.

9. In a grain weighing machine of the class having a hopper, a drum provided with a plurality of pockets, said drum rotatably mounted in said hopper and turning by the weight of the load of grain in the pockets whereby the grain is discharged into the hopper, and scale beam means operatively associated with the drum to selectively determine the weight necessary to turn the drum, the combination therewith of improvements comprising a chute supported by and spaced above said hopper, said chute provided with a discharge opening positioned to direct grain into said pockets, a closure member for said discharge opening, a crank arm engaged with said closure member for moving the same to open and closed position respectively, clamp means releasably engageable with said crank arm to hold the same in position where said closure member is open, metering means connected to said drum for selectively limiting the number of rotations of said drum, means on said metering means for acting upon and releasing said clamp means after a predetermined number of drum rotations, and means automatically acting upon said crank arm when said clamp means is released to effect movement of said closure member to closed position.

References Cited in the file of this patent

UNITED STATES PATENTS

| | | |
|---|---|---|
| 178,046 | Carmony | May 30, 1876 |
| 481,084 | Wakefield | Aug. 16, 1892 |
| 481,810 | O'Connor | Aug. 30, 1892 |
| 572,504 | Dennis | Dec. 1, 1896 |
| 580,245 | Arne | Apr. 6, 1897 |
| 774,777 | Polte | Nov. 15, 1904 |
| 781,910 | Sauer | Feb. 7, 1905 |
| 1,239,839 | Staaf | Sept. 11, 1917 |
| 1,574,706 | Smith et al. | Feb. 23, 1926 |
| 1,615,485 | Rees | Jan. 25, 1927 |
| 2,088,552 | Hale | July 27, 1937 |

FOREIGN PATENTS

| | | |
|---|---|---|
| 219,134 | Great Britain | Mar. 24, 1924 |
| 431,581 | Great Britain | July 11, 1935 |